Dec. 13, 1966   B. O. J. S. MÖRNER   3,291,169
SAW CHAINS
Filed June 3, 1964
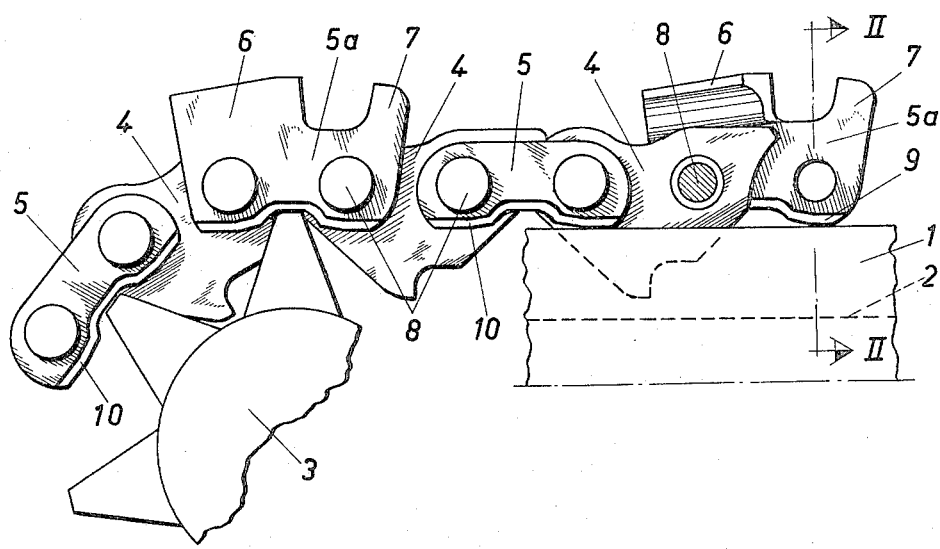
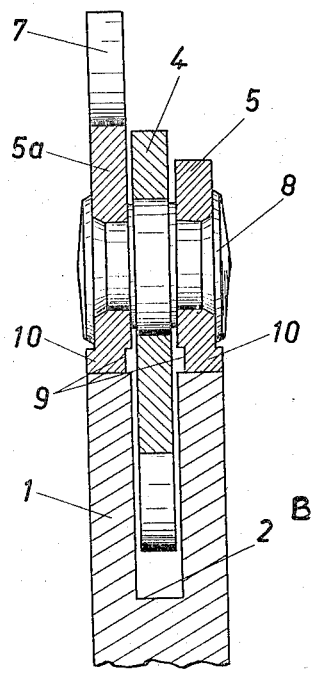
INVENTOR
BENGT OLOF JOHAN STELLAN MÖRNER
BY Linton and Linton
ATTORNEYS United States Patent Office 3,291,169
Patented Dec. 13, 1966

3,291,169
SAW CHAINS
Bengt Olof Johan Stellan Mörner, Goteborg, Sweden, assignor to Aktiebolaget Partner, Molndal, Sweden
Filed June 3, 1964, Ser. No. 372,183
Claims priority, application Sweden, June 17, 1963, 6,661/63
4 Claims. (Cl. 143—135)

The present invention relates to motorsaw chains of the type comprising center links with a portion running in a groove on the edge of the blade, and side links adapted to run along the edge portions of the blade on either side of the groove.

When using saws of this type, the chain will be exposed to strains and stresses which may result in upsetting the edge portions of the side links bearing against the blade as well as against the tooth addendum of the driving pinion. Due to the friction against the center links, the burrs thus produced at the edges of the side links opposite the center links are apt to oppose the turning of the links on the interconnecting pivots, with the result that very powerful resistance is set up against the bending of the chain over the ends of the blade. Apart from the gradually increasing resistance against the aforesaid bending action, which results in greatly increased wear and tear, there is the risk that some links may finally become interlocked due to the prevalence of the burrs.

This drawback will be eliminated by the present invention according to which the sides of the opposingly facing side-links show a recessed portion next to the said edge relative to a plane coinciding with the inside of the link. In a chain of this design, a space for upsetting burrs has been provided between each side link and adjacent center link, in which space the said burrs may be permitted to grow to such a size that they will be broken off in the course of sawing before they are brought to bear against the side links, or at least set up any friction against same.

According to the invention, the space between the recessed portions of the opposingly facing side links is preferably somewhat wider than the width of the groove in the blade.

The recessed portions are preferably produced by die sinking in such a manner that a projecting ledge corresponding to the recess is formed at the outside of the side links.

The space between the off-turned sides of the projecting ledges and the opposingly facing side links should preferably be substantially equal to the thickness of the saw blade.

The invention will be further described below in conjunction with the attached drawing, in which FIG. 1 represents a side elevation of a portion of a saw chain according to the invention, with the blade partially indicated. FIG. 2 represents a cross section of the chain and blade along the line II—II in FIG. 1.

The numeral 1 in the drawing refers to a saw blade of which a small portion only has been shown. In a manner known per se, the blade has an elongated form and the edge is provided with a groove 2 for accommodation of the chain. The numeral 3 denotes a toothed wheel disposed at one end of the blade by means of which the chain is propelled forward when placed in position around same. The chain saw is composed of center links 4 and side links 5, 5a of which those denoted 5a have been designed with a cutting tooth 6 and a leading edge located just ahead of the said tooth in the direction of movement of the chain (from left to right in FIG. 1). The links are interconnected in known manner by means of riveted pivots 8, each pair of adjacent center links 4 being connected together by a pair of side links facing each other on either side of the center links, every other pair comprising two identical links 5 and every other pair a link 5 and a cutting tooth link 5a. The latter links are arranged alternatively, first on one side and then on the other side of the center links.

The lower edges of the side links 5, 5a which, in known manner, run on the blade edge portions on either side of the groove, are somewhat offset in relation to the side links in the direction from the mean longitudinal plane. This has been accomplished by a marginal portion of each side link located in close proximity to the said edges having been displaced by die sinking from the plane of the link with the result that a recess 9 is formed at the inside face of the link, i.e. at the side facing the mean longitudinal plane of the chain, and a projecting ledge 10 on the outside face, corresponding in size and shape to the recessed portion. Most preferably, the whole assembly can be so dimensioned that the space between the recessed portions 9 of opposingly facing side links is somewhat larger than the width of the groove 2 in the blade, and the width between the outside faces of the ledges 10 of opposingly facing links is substantially equal to the thickness of the blade.

Due to the provision of the side link recess 9, an empty space is created at the edge of the link which is exposed to the risk of upsetting and which bears against the blade as well as against the tooth addenum of the driving pinion, between the said edge and that located opposite the center link 4, with the result that the gradually developing burrs on the inside of the side links may be permitted, without having any detrimental effect on the function of the chain, to assume such a size that they are easily broken or knocked off before they set up so much friction against the center link that the bending of the chain is aggravated.

When the recesses 9 are produced by die sinking so that a protruding ledge corresponding to the size of the recessed portion is formed on the outside of the links, this will have the advantage of preventing the contact surface of the link against the blade from diminishing. By executing the die sinking operation in such a manner that the outsides of the ledges 10 will be located substantially in plane with the flat sides of the saw blade, the width of the edge portions surrounding the groove 2 in the blade will be efficiently utilized so as to provide the largest possible contact surface while at the same time the space between the bottom of the recess 9 and the center link 4, located immediately opposite, will be as large as possible. The edge portions which are recessed in relation to the inside of the side links may, however, be produced in many other ways, and the invention, therefore, is not limited to the embodiment shown in the drawing and the design described above as an example. Modifications as to details may therefore be carried out without deviating from the basic idea of the invention.

Thus, for example, it is not necessary for the recessed portion 9 to proceed unbroken along the entire side link. The said portion may, for example, comprise a plurality of sections separated from each other by an empty space.

What I claim is:
1. In a motorsaw having a saw blade with an edge groove, a toothed wheel rotatably disposed at one end of said blade and a chain positioned along said blade edge and around said toothed wheel, an improvement in said chain comprising center links, side links pivotally connected to said center links, each of said side links having a side slideably positioned on said blade edge along one side of said blade edge groove when on said blade and each of said side links having an inside marginal por- tion adjacent said side thereof recessed relative to a plane coinciding with the inside of the link.

2. In a motorsaw having a blade with an edge groove, a toothed wheel rotatably disposed at one end of said blade and a chain positioned along said blade edge and around said toothed wheel, an improvement in said chain as claimed in claim 1 wherein pairs of said side links have their inside faces facing one another with their recessed marginal portions spaced apart a distance greater than the width of said blade groove.

3. In a motorsaw having a blade with an edge groove, a toothed wheel rotatable disposed at one end of said blade and a chain positioned along said blade edge and around said toothed wheel, an improvement in said chain as claimed in claim 1 wherein each of said side links has a projecting ledge adjacent said side thereof of a configuration corresponding to that of its recesed inside marginal portion.

4. In a motorsaw having a blade with an edge groove, a toothed wheel rotatably disposed at one end of said blade and a chain positioned along said blade edge and around said toothed wheel, an improvement in said chain as claimed in claim 1 including each of said side links having an outside projecting ledge adjacent said thereof and pairs of said side links having inside faces facing one another and outside faces of their ledges spaced apart a distance equal to the thickness of said blade.

References Cited by the Examiner

FOREIGN PATENTS 885,478   8/1953   Germany.
443,310   12/1948   Italy.

DONALD R. SCHRAN, *Primary Examiner.*